United States Patent
Hansen

(10) Patent No.: US 10,318,771 B2
(45) Date of Patent: Jun. 11, 2019

(54) INVENTORY ASSISTANCE DEVICE AND METHOD

(71) Applicant: Intermec Technologies Corporation, Fort Mill, SC (US)

(72) Inventor: Michael Hansen, Everett, WA (US)

(73) Assignee: INTERMEC IP CORP., Fort Mill, SC (US)

( * ) Notice: Subject to any disclaimer, the term of this patent is extended or adjusted under 35 U.S.C. 154(b) by 469 days.

(21) Appl. No.: 15/145,144

(22) Filed: May 3, 2016

(65) Prior Publication Data

US 2016/0247006 A1   Aug. 25, 2016

Related U.S. Application Data

(63) Continuation of application No. 13/756,115, filed on Jan. 31, 2013, now abandoned.

(51) Int. Cl.
*G06Q 10/08* (2012.01)
*G06K 7/10* (2006.01)
(Continued)

(52) U.S. Cl.
CPC ....... *G06K 7/10366* (2013.01); *G06Q 10/087* (2013.01); *G08B 3/10* (2013.01); *G08B 5/36* (2013.01); *G08B 6/00* (2013.01)

(58) Field of Classification Search
USPC ....................................................... 705/28
See application file for complete search history.

(56) References Cited

U.S. PATENT DOCUMENTS 5,212,372 A * 5/1993 Quick .................... G06F 3/014
                                              235/462.44
5,646,616 A * 7/1997 Komatsu ............. B65G 1/1375
                                                340/5.91
(Continued)

FOREIGN PATENT DOCUMENTS

EP       2823439 A1   1/2015
GB       2511922 A    9/2014
(Continued)

OTHER PUBLICATIONS

Great Britain Search Report and Office Action for Application No. GB1401049.0, dated Jul. 11, 2014, 7 pages.
(Continued)

*Primary Examiner* — Ashford S Hayles
(74) *Attorney, Agent, or Firm* — Additon, Higgins & Pendleton, P.A.

(57) ABSTRACT

A system comprises two or more item storage bins, each item storage bin comprising: a wireless communication tag emitting a wireless signal having data identifying the item storage bin on which the wireless communication tag is positioned, and an indicator activated by receiving a feedback signal identifying the item storage bin on which the indicator is positioned; and a personal device comprising: a wireless communicator configured to communicate with the wireless communication tags, and a controller coupled to the wireless communicator and configured to identify one of the item storage bins from the wireless signal, and in response to identifying the one item storage bin, sending the feedback signal through the wireless communicator to the indicator.

20 Claims, 2 Drawing Sheets

(51) Int. Cl.
*G08B 3/10* (2006.01)
*G08B 5/36* (2006.01)
*G08B 6/00* (2006.01)

(56) References Cited

U.S. PATENT DOCUMENTS

| | | | | |
|---|---|---|---|---|
| 5,781,443 | A * | 7/1998 | Street | G05B 19/41805 700/214 |
| 5,812,986 | A * | 9/1998 | Danelski | G06F 3/147 705/22 |
| 6,098,877 | A * | 8/2000 | Barkan | G06K 7/10891 235/22 |
| 6,574,672 | B1 * | 6/2003 | Mitchell | G06F 1/163 709/200 |
| 6,595,420 | B1 * | 7/2003 | Wilz, Sr. | B82Y 15/00 235/462.01 |
| 6,607,134 | B1 * | 8/2003 | Bard | G04B 47/00 235/462.44 |
| 6,762,681 | B1 * | 7/2004 | Danelski | B65G 1/137 340/5.2 |
| 7,077,318 | B2 * | 7/2006 | Venema | G06Q 10/087 235/383 |
| 7,385,498 | B2 * | 6/2008 | Dobosz | G06K 7/10386 340/539.12 |
| 7,516,890 | B1 | 4/2009 | Spremo et al. | |
| 7,839,625 | B2 * | 11/2010 | Gunning | G06Q 10/087 235/375 |
| 8,235,294 | B2 * | 8/2012 | Miller | G06K 7/0004 235/472.02 |
| 8,260,384 | B2 * | 9/2012 | Wulff | A45F 5/00 224/267 |
| 8,659,397 | B2 * | 2/2014 | Vargo | G06K 7/0008 340/10.4 |
| 2002/0044058 | A1 * | 4/2002 | Heinrich | G06K 7/0008 340/572.1 |
| 2002/0070846 | A1 * | 6/2002 | Bastian, II | G06F 3/147 340/5.92 |
| 2002/0178830 | A1 * | 12/2002 | Kazerooni | B65G 43/00 73/760 |
| 2003/0233165 | A1 * | 12/2003 | Hein | G06Q 10/087 700/216 |
| 2004/0051368 | A1 | 3/2004 | Caputo et al. | |
| 2005/0060246 | A1 * | 3/2005 | Lastinger | G06K 17/0022 705/28 |
| 2005/0071234 | A1 * | 3/2005 | Schon | G06Q 10/08 705/22 |
| 2005/0140498 | A1 * | 6/2005 | Bastian, II | G06Q 10/087 340/5.92 |
| 2005/0149226 | A1 * | 7/2005 | Stevens | G65G 1/1371 700/214 |
| 2006/0022824 | A1 * | 2/2006 | Olsen, III | B07C 7/005 340/572.1 |
| 2006/0044112 | A1 * | 3/2006 | Bridgelall | G06K 17/0022 340/10.1 |
| 2006/0065713 | A1 | 3/2006 | Kingery | |
| 2006/0206235 | A1 * | 9/2006 | Shakes | G06Q 10/08 700/216 |
| 2007/0008152 | A1 * | 1/2007 | Parias | F17C 13/003 340/573.1 |
| 2007/0050080 | A1 * | 3/2007 | Peck | B65G 1/137 700/214 |
| 2007/0050271 | A1 * | 3/2007 | Ufford | G06Q 10/087 705/28 |
| 2007/0080930 | A1 * | 4/2007 | Logan | G06Q 10/06 345/156 |
| 2007/0120682 | A1 * | 5/2007 | Rea | G01S 13/878 340/572.8 |
| 2007/0191983 | A1 * | 8/2007 | Griffits | A47G 19/2227 700/213 |
| 2007/0290988 | A1 * | 12/2007 | Nogami | G06F 3/016 345/156 |
| 2008/0054062 | A1 * | 3/2008 | Gunning | G06K 7/10891 235/375 |
| 2008/0077511 | A1 * | 3/2008 | Zimmerman | G06Q 10/00 705/28 |
| 2008/0115636 | A1 * | 5/2008 | DeRose | B25B 23/1425 81/479 |
| 2008/0183327 | A1 * | 7/2008 | Danelski | B65G 1/137 700/216 |
| 2008/0291043 | A1 * | 11/2008 | Duron | G06F 21/74 340/686.6 |
| 2009/0085718 | A1 * | 4/2009 | Hamel | A61B 17/00 340/5.5 |
| 2009/0166415 | A1 * | 7/2009 | Braun | G06Q 10/087 235/385 |
| 2009/0256672 | A1 | 10/2009 | Yamamoto et al. | |
| 2009/0272811 | A1 * | 11/2009 | An | G06K 7/10891 235/462.44 |
| 2010/0097195 | A1 * | 4/2010 | Majoros | G06K 7/0008 340/10.6 |
| 2010/0238005 | A1 * | 9/2010 | White | G08B 6/00 340/407.2 |
| 2010/0271187 | A1 * | 10/2010 | Uysal | G06K 7/0008 340/10.4 |
| 2012/0028577 | A1 * | 2/2012 | Rodriguez | H04N 21/44008 455/41.1 |
| 2012/0038466 | A1 * | 2/2012 | Huang | B65G 1/1373 340/10.42 |
| 2012/0140042 | A1 * | 6/2012 | Albertson | G08B 13/19613 348/46 |
| 2012/0218089 | A1 * | 8/2012 | Hill | G06F 3/016 340/407.1 |
| 2013/0127755 | A1 * | 5/2013 | Lynn | G08B 6/00 345/173 |
| 2013/0154809 | A1 * | 6/2013 | Subramanian | G01S 13/878 340/10.42 |
| 2013/0292476 | A1 * | 11/2013 | Miller | G06K 7/0004 235/462.46 |
| 2014/0062700 | A1 * | 3/2014 | Heine | G08B 13/2462 340/572.1 |
| 2014/0083058 | A1 * | 3/2014 | Issing | B65G 1/1378 53/473 |
| 2014/0166754 | A1 * | 6/2014 | Vargo | G06K 7/0008 235/439 |
| 2014/0214631 | A1 | 7/2014 | Hansen et al. | |
| 2016/0247006 | A1 | 8/2016 | Hansen et al. | |

FOREIGN PATENT DOCUMENTS

| | | |
|---|---|---|
| JP | 2007-233737 A | 9/2007 |
| JP | 2007233737 A | 9/2007 |
| JP | 2009-137748 A | 6/2009 |
| JP | 2009137748 A * | 6/2009 |
| WO | 2011079352 A1 | 7/2011 |
| WO | 2013134409 A1 | 9/2013 |

OTHER PUBLICATIONS

Great Britain Search Report and Office Action for counterpart GB Application No. 1401049.0 dated Jul. 11, 2014, pp. 7.
Great Britain Examination Report in related GB Application No. 1401049.0.~, dated Mar. 16, 2016, 2 page.

* cited by examiner

INVENTORY ASSISTANCE DEVICE AND METHOD

CROSS-REFERENCE TO RELATED APPLICATION

The present application claims the benefit of U.S. patent application Ser. No. 13/756,115 for an Inventory Assistance Device and Method filed Jan. 1, 2013 (and published Jul. 31, 2014 as U.S. Patent Publication No. 2014/0214631). Each of the foregoing patent application and patent publication is hereby incorporated by reference in its entirety.

BACKGROUND

Inventory systems (sometimes called "order picking" systems) employ various devices that interact through wired or wireless communication to assist workers in locating, identifying, and selecting items in a warehouse setting when such items need to be retrieved to fulfill an order, or the like. A worker may use a handheld device that communicates with a backend inventory system such that the worker may be given directions to a specific location in a warehouse to retrieve the item needed. However, because of the sheer number of items in many warehouses and the smaller size of some inventory items, difficulty results in quickly retrieving items and correctly so. That is, in a large inventory environment, a particular difficulty arises when there are so many possible locations for specific items within the warehouse environment. Even if a row or aisle is identified by a system, a great number of items may be located in such a row or aisle and may be stacked into different height levels. Further yet, smaller items may be located in rather small bins or containers. Such granularity in an inventory system may prove challenging even if very specific directions or locations are provided.

For example, a location identification of aisle 4, section 23A, shelf B may still leave a large area for a worker to look for a needed item. Often, a worker may be right on top of a needed item, but spend a significant amount of time verifying a specific item by a SKU number or part number. Further, with such numbers often so very redundant or similar, a worker may select an incorrect item in a bin next to the correct item all the while thinking that the correct item has been retrieved. Without specific feedback from an inventory picking system, workers may be prone to mistakes.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a device that may be used within a system for assisting with inventory ordering and management. In an embodiment, a personal device may be used by a worker to assist with identifying and retrieving items in an inventory or warehouse setting. Such a personal device may be worn on a wrist or hand or any other convenient manner of moving the device into proximity with possible items for selection and retrieval. In this sense, the worker may maneuver a hand having the device toward various items. The device includes a communications module suited to interface with radio frequency identification (RFID) tags that may be attached to the items to be selected or a bin that holds the items to be selected. If the worker has maneuvered his or her hand (e.g., the device itself worn on or near the hand) close enough to a correct RFID tag, then the device can provide positive feedback to the worker indicating selection of a needed item. Similarly, if the worker has come into communicative proximity with an item not needed, then negative feedback at the device may be implemented. Further, the device may be suited to interface with a portable handheld computing device such that upon selection of a needed item, inventory levels and order fulfillment databases in a larger back-end inventory system may be updated accordingly. These and other aspects and features of the device and corresponding system are discussed below with respect to FIGS. 1-4.

Figure 1:
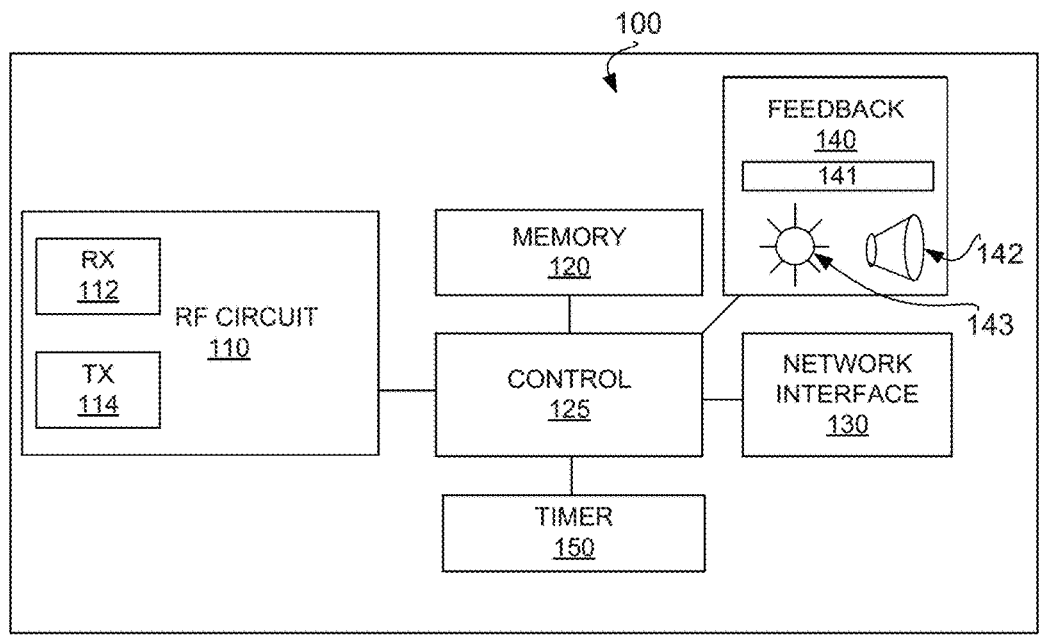
FIG. 1 is a block diagram of an inventory assistance device according to an embodiment of the subject matter disclosed herein.

FIG. 1 is a block diagram of an inventory assistance device 100 according to an embodiment of the subject matter disclosed herein. The device as described herein may be a personal device typically carried or worn by a person. Various embodiments of the device, such as glove embodiments and wristband embodiments, are discussed below with respect to other FIGS. With respect to FIG. 1, the device will be discussed in terms of functional blocks regardless of the physical embodiment.

The device 100 is configured to communicatively interface with both a larger back-end inventory system (not shown in FIG. 1) as well as individual items or item bins (also not shown in FIG. 1). Such communications may be realized through one or both of two different communications modules within the device 100. In the embodiment of FIG. 1, the two communications modules are a radio frequency (RF) circuit 110 for communicating with RF tags at local items or item bins and a network interface 130 for communicating with a packet-based switched network coupled to the larger back-end inventory system. Further, in some embodiments, the circuit 110 may be a near field communication (NFC) module.

A first communication module includes an RF circuit 110 configured according to an ultra-low-power wireless (ULPW) standard (e.g., BlueTooth™ or the like). The RF circuit 110 may include a transmitter 114 as well as a receiver 112. In a typical configuration, the device 100 may be set to continuously scan for detection of RF tags that may be disposed on or near specific items that a user seeks. Such a continuous scanning may be accomplished via the receiver 112 of the RF circuit 110. As various RF tags are detected, the receiver 112 may send tag information (e.g., information that identifies an item in which the RF tag is assigned) to a controller 125 to determine if the recently scanned RF tag is a match to an item being sought or not a match. The controller 125 may access a memory 120 that contains RF tag information of items being sought.

The controller 125 is further configured to provide a feedback signal to a feedback module 140 based on whether or not the item scanned is a match or is not a match. If the item is a match, then a feedback signal may be a positive feedback signal to the feedback module 140. If the item is not a match, then the feedback signal to the feedback module 140 will be a negative signal. The feedback module 140 may be used to receive the positive or negative feedback signal from the controller 125 and provide one or more indications to a user about whether the feedback is positive or negative. Such indications may be haptic, aural, and/or visual.

For example, if the feedback signal is positive, the feedback module 140 may vibrate with two short bursts via a haptic device 141 (or similar haptic vibration motor circuit or piezoelectric circuit). If the feedback signal is negative, the feedback module 140 may vibrate with one long sustained burst via the piezoelectric circuit 141. Additional indications may be used as well, such as an audible sound via a speaker 142 indicating positive (e.g., a bell) or negative (e.g., a buzzer) feedback or visual indications such as a green LED flash via an LED 143 for positive feedback and a red LED flash for negative feedback. One or more indications may be used to indicate to the user a positive item selection or a negative item selection.

As feedback indications are implemented, a timer 150 or clock module may be used by the controller 125 interrupt the RF circuit 110 scanning for a specified amount of time so as to allow a user to acknowledge the feedback. Such a time duration may be between 2 and 10 seconds in one embodiment although other time durations are possible. This allows a user enough time to replace any incorrectly selected items (and indicated by a negative feedback indication) or to acknowledge selection of the correct item so as to remove the correctly selected item's RF tag information from the memory 120 of items being sought.

Turning attention back to the RF circuit 110, the transmitter 114 may be configured to send ULPW signals to various other devices, such as a handheld computer, a personal computer or other device having an ULPW receiver. In this manner, the device 100 may engage in two-way communications with other devices for updating other computers and databases about the actions of the worker.

Such communication via the RF circuit 100 may be under the control of the local controller 125 in conjunction with a remote device (not shown in FIG. 1) communicating with the device 100 via the RF circuit 110. As such, if a user of a remote device (such as a handheld computer) initiates a procedure for selecting a specific item from an inventory, the remote device may communicate RF information to the device 100 (to be stored in the memory 120) that corresponds to a specific item is to be detected and selected. As the device 100 comes into proximity with various items that have RFID tags thereon, the aforementioned feedback signals may be generated to indicate positive or negative feedback.

In one embodiment, the device 100 may also communicate (or instead of) via the second communications module, a wireless network interface 130, with various other devices, such as a handheld computer, a personal computer or other device having a wireless network interface therein. Thus, using known wireless communication protocols, the device 100 and other device communicatively coupled to the device 100 may exchange inventory information as described above. In the next paragraphs, overall system embodiments are discussed that incorporate other devices in communication with the device 100 of FIG. 1.

Figure 2:
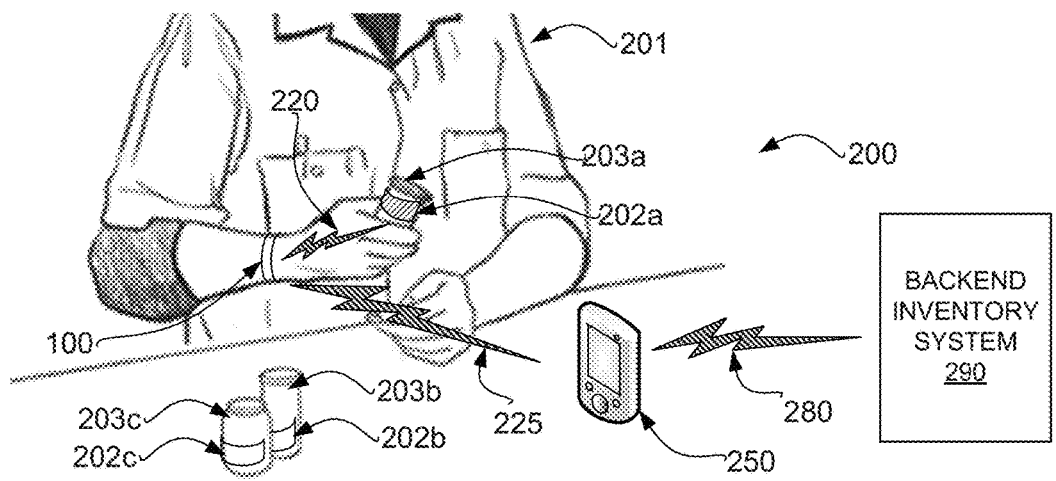
FIG. 2 is a diagram of an inventory assistance system according to an embodiment of the subject matter disclosed herein.

FIG. 2 is a diagram of an inventory assistance system according to an embodiment of the subject matter disclosed herein. In this system embodiment, a worker 201 may be tasked with retrieving one or more items from an inventory of items. Thus, the worker 201 may be equipped with the device 100 of FIG. 1 as well as a handheld computing device 250 or other similar portable computing device. In the embodiment shown in FIG. 2, the device 100 comprises a wristband embodiment, although as discussed above, other embodiments are contemplated such as a glove, a coat or vest, headphones, eyeglasses, visor, or any other wearable device (all of which are not shown in the figures).

As discussed above with respect to FIG. 1, the device 100 may be communicatively coupled 220 with various items, such as item 203a, via an RFID or NFC communication standard. The item 203a may include an RFID tag of NFC tag 202a such that the communicative coupling 220 provides identifying information to the device 100 for the item 203a held in the worker's hand. If this held item 203a is identified by the controller (not shown in FIG. 2) of the device 100 as an item to be retrieved, the device 100 may provide a positive feedback to the worker 201 by vibrating quickly twice (or some other manner or providing positive feedback, be it haptic, aural, or visual). Similarly, if the item 203a is not the item that is needed, the device 100 may provide negative feedback (e.g., a longer sustained vibration).

As the worker 201 is typically in an environment with several items available for selection, such as items 203b and 203c as shown, the device 100 may have a specifically calibrated communication range such that only items in the worker's hand are within communication range. In this manner, RFID of NFC tags 202b and 202c on other items are not detected by the device when not in the worker's hand. The range may be calibrated to have different ranges such that in different settings a larger range is applicable, such as when a worker is to retrieve items stored on shelves in a warehouse.

As the worker 201 begins using the system, the worker may enable proximity assistance with the device 100 for selecting one or more items to be retrieved using a portable computing device, such as handheld computer 250, which is communicatively coupled 225 to the device 100. Thus, in initiating a session, the memory of the device 100 (memory not shown in FIG. 1) may be populated with one or more codes corresponding to RFID tags or NFC tags associated with desired items. Then, as the worker 201 comes into proximity with an item associated with a code in the memory (e.g., the RF receiver of the device 100 as shown in FIG. 1 reads an RFID tag or NFC tag from a needed item), the device may then indicate to the handheld computer 250 that the item has been selected (in addition to the positive feedback at the device itself. In other embodiments, the worker 201 may acknowledge the positive feedback prior to the device communicating back to the handheld computing device 250. Such an acknowledgement may be haptic, such as a wrist shake, or may be the worker 201 actuating an acknowledgment input on the device 100 or the handheld computer 250.

The handheld device 250 may also be communicatively coupled 280 to a back-end inventory system 290 wherein inventory levels may be incremented or decremented by the actions of the worker 201. Additional automated events may occur via the back-end inventory system 290 as well, such as order fulfillment communications, inventory restocking orders, or any other inventory action. Such actions may be accomplished in response to positive or negative feedback generated by the worker coming into proximity with items to be selected or items that are not among items to be selected.

Such a system as described may have multiple applications. In one example, consider a hospital worker that is tasked with dispensing the correct medication to the correct patient in the correct dosage. The system of FIG. 2 tracks the grasping of various tagged medication containers. The task managing intelligence (e.g., the controller 125) determines what operation is to be performed next in time and determines the worker's location. Communications between the personal device and the item being grasped confirms whether or not the item is the appropriate association for the task at the current location at the current time. Further communications between worker and item may confirm the correct dispensing of medication. The location of the patient, the worker, and the medication are all confirmed as appropriate and presented to the worker as feedback in a haptic, aural or visual manner.

Further tracking may be done to ensure that unused medication is restored to its correct location once the task is completed. Feedback may then indicate to the worker that another task is to be performed, thereby repeating the process.

Figure 3:
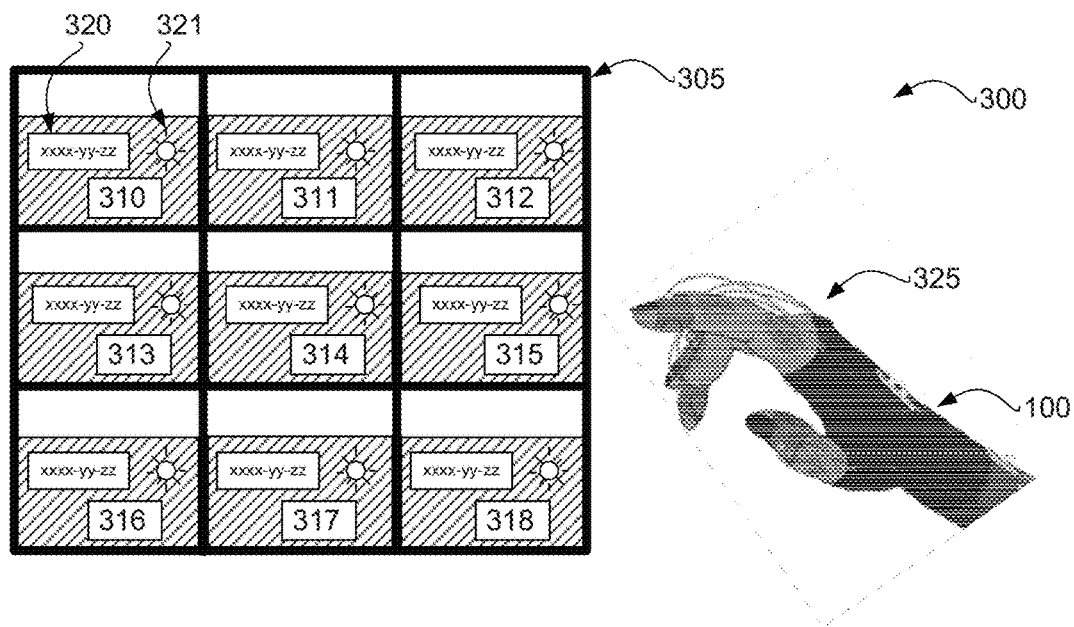
FIG. 3 is a diagram of an inventory assistance system according to a further embodiment of the subject matter disclosed herein.

FIG. 3 is a diagram of an inventory assistance system 300 according to a further embodiment of the subject matter disclosed herein. In this embodiment, a worker (only the worker's hand 325 is shown in FIG. 3) may be using a device 100 as discussed above in conjunction with FIGS. 1 and 2. In this embodiment, the device 100 is a glove-like embodiment worn on the worker's hand 325. Further, the worker may be engaging with items that are stored in a group of bins 305. As shown, there are nine bins shown in FIG. 3 including bins 311-318. Further, each of the bins 311-318 may include an alphanumeric indicator to assist in identifying the bins that is also an RFID tag or NFC tag. For example, the bin 311 includes tag 320 that may interface with the device 100 when proximity is detected.

In this embodiment, the RFID tags may communicate with the device 100 when it is within the calibrated range as has been described. As described above, the device may then indicate positive and negative feedback accordingly. Additionally, or in some embodiments associated with FIG. 3, instead of, providing the feedback to a feedback module in the device 100, the local RFID tag may include a feedback module (not shown in detail) for positive or negative feedback. As shown, an indicator light 321 may be enabled when the correct bin (in this case bin 311 having RFID tag 320). For example, a worker may need to retrieve an item from bin 311, but not know that bin 311 contains the item for which the worker is attempting to retrieve. Thus, the worker could maneuver a hand 325 in front of all of the bins 311-318 until one of the bins lights up; in this example, the light 321 on bin 311 will light up. This will light up because the device 100 came into communicative coupling with the RFID tag 320 of bin 311 and generated a positive feedback. Further, the device 100 itself may provide positive haptic, visual or aural feedback as well.

Figure 4:
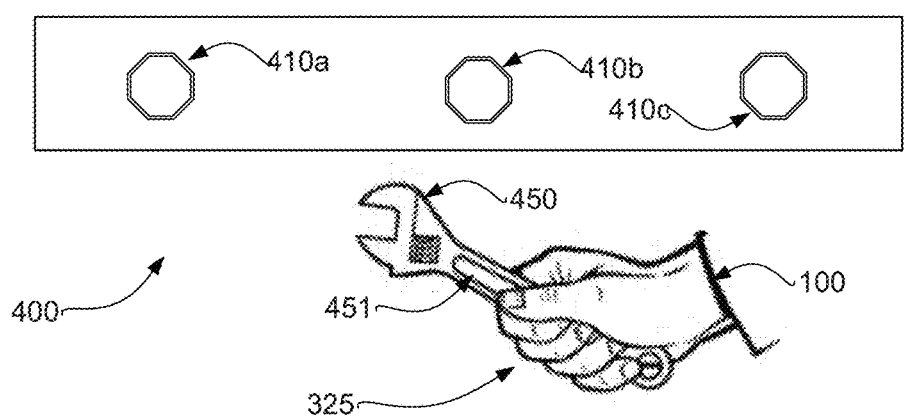
FIG. 4 is a diagram of a tool assistance system according to a further embodiment of the subject matter disclosed herein.

FIG. 4 is a diagram of a tool assistance system 400 according to a further embodiment of the subject matter disclosed herein. In this embodiment, a tool 450 may be used in conjunction with the device 100 of FIG. 1. The tool 450 may include an RFID tag 451 thereon that may communicatively interface with the device 100 worn by a worker who may be using the tool 450. As the worker's hand (with the device 100 worn thereabout) comes into proximity with the tool 450, the identified RFID tag 451 may trigger a communication from the device 100 to a back-end system (not shown in FIG. 4) to download specific information about the tool 450 to be used to the device 100. Such information may be specifics about the tool 450, such as an amount of torque to apply to particular bolts 410a-410c in the case of a torque wrench.

Thus, the tool may be calibrated in conjunction with the RFID tag to generate an RF signal for a series of different torques reached when being used. Once the correct torque is reached by the particular application, the device 100 may identify an RFID signal associated with the required torque, thereby generating a positive feedback to the wrist-worn device. Then a worker may continue torqueing a bolt until positive feedback is sensed. In this manner, the worker needs not remember how much torque for various applications, but rather simply apply torque until the device 100 indicates that enough torque has been reached. Additionally, once the correct torque has been reached, the device may communicate with the back-end system to indicate that the task has been completed. Thus, the back end system may be used to track worker activity for consistency and accuracy as well. With various tools being equipped with RFID tags, a worker wearing the device 100 may be assisted by the device 100 itself, since the device 100 may be used to indicate proper use of the identified tool for particular applications.

Consider as another example, an aircraft mechanic performing maintenance on an aircraft engine. The system 400 is able to track and time his or her tasks and ensure the correct tools (objects) and handling procedures are carried out. Since the system is aware of the object, the mechanic, the mechanic's manipulation of the object, and where and when the task is performed, the system is able to guide, audit, and otherwise measure the performance of the mechanic via updating of backend databases and haptic, visual or aural feedback to the mechanic. The system allows a remote intelligence in a back end system to track and or modify the behavior of the mechanic's activity in association with objects in the environment needed for a specific interaction.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the disclosure.

What is claimed is:

1. A system, comprising:
   two or more item storage bins, each item storage bin comprising:
   a wireless communication tag emitting a wireless signal having data identifying the item storage bin on which the wireless communication tag is positioned, and
   an indicator activated by receiving, from a personal device, a feedback signal identifying the item storage bin on which the indicator is positioned; and the personal device, comprising:
  a feedback module;
  a wireless communicator configured to communicate with the wireless communication tags; and
  a controller coupled to the wireless communicator, the controller configured to continuously scan for detection of the tags located within range of the wireless communicator, identify one of the two or more item storage bins from the wireless signal, and, in response to identifying the one item storage bin, sending the feedback signal through the wireless communicator to the indicator.

2. The system of claim 1, wherein the indicator is a light emitting diode.

3. The system of claim 1, wherein the indicator emits light as positive feedback in response to receiving the bin-specific feedback signal.

4. The system of claim 1, wherein the wireless communication tag is a radio frequency identification tag.

5. The system of claim 1, wherein the wireless communicator communicates with the wireless communication tag when the wireless communicator is within a calibrated distance from the wireless communication tag.

6. The system of claim 1, wherein the personal device comprises a memory coupled to the controller and configured to store data identifying the item storage bin that corresponds to the wireless signal emitted from the wireless communication tag positioned thereon.

7. The system of claim 1, wherein the personal device comprises a wristband.

8. The system of claim 1, wherein the personal device comprises a glove.

9. The system of claim 1, wherein the personal device is configured to provide a feedback via the feedback module in response to sending the feedback signal.

10. The system of claim 1, wherein the personal device generates a haptic indication via the feedback module in response to sending the feedback signal.

11. The system of claim 1, wherein the personal device generates an aural indication via the feedback module in response to sending the feedback signal.

12. The system of claim 1, wherein the personal device generates a visual indication via the feedback module in response to sending the feedback signal.

13. A method, comprising:
  storing bin-identifying data in a personal device memory about one or more specific item storage bins, the one or more specific item storage bins being a subset of a plurality of item storage bins;
  selecting a specific item storage bin from the plurality of item storage bins;
  determining an identification of the selected specific item storage bin by detecting, with the personal device, a wireless signal generated by a wireless communication tag disposed on the selected specific item storage bin when the personal device is in proximity to the selected specific item storage bin;
  sending, with the personal device, a feedback signal to an indicator positioned on the selected specific item storage bin in response to determining the identification; and
  generating a positive feedback with the indicator positioned on the selected specific item storage bin in response to receiving the feedback signal.

14. The method of claim 13, wherein the indicator is a light emitting diode.

15. The method of claim 13, wherein the wireless communication tag is a radio frequency identification tag.

16. The method of claim 13, wherein the indicator emits light as positive feedback in response to receiving the feedback signal.

17. The method of claim 13, comprising generating a positive feedback with the personal device when the feedback signal is sent.

18. The method of claim 17, wherein the positive feedback is haptic, aural, visual feedback, or any combination thereof.

19. The method of claim 13, comprising:
  communicating the feedback signal to a remote computer system having a memory; and
  updating a record stored in the memory.

20. The method of claim 19, wherein the record is inventory levels.

* * * * *